United States Patent [19]
Greenwood et al.

[11] Patent Number: 5,449,483
[45] Date of Patent: Sep. 12, 1995

[54] METHOD AND APPARATUS FOR MAKING A TIRE MOLD

[75] Inventors: Alan Greenwood, Kent; Paul T. Hardy, Wadsworth, both of Ohio; Veronique Moris-Herbeuval, Arlon, Belgium; Werner Hillman, Bissen, Luxembourg; Norbert Majerus, Akron, Ohio; Douglas E. Pryor, Uniontown, Ohio; Timothy M. Rooney, Munroe Falls, Ohio; Ronda R. Bayer-Thayer, Barberton, Ohio; David L. Wolfe, Akron, Ohio

[73] Assignee: The Goodyear Tire & Rubber Company, Akron, Ohio

[21] Appl. No.: 191,081

[22] Filed: Feb. 4, 1994

[51] Int. Cl.⁶ .................. B29C 33/40; B29C 45/14
[52] U.S. Cl. ......................... 264/155; 164/19; 164/46; 164/165; 249/159; 249/170; 264/162; 264/221; 264/225; 264/255; 264/259; 264/309; 425/127; 425/129.1; 425/176; 425/188; 425/192 R; 425/422; 425/DIG. 50
[58] Field of Search ............ 425/188, 192 R, 175, 425/176, 127, 129.1, 256, 442, DIG. 50; 264/221, 225, DIG. 72, 226, 227, 220, 255, 259, 162, 155, 279.6, 309, 328.18; 249/159, 170; 164/19, 24, 35, 46, 165, 514

[56] References Cited

U.S. PATENT DOCUMENTS

| | | | |
|---|---|---|---|
| 1,615,474 | 1/1927 | Midgley | 264/225 |
| 1,767,163 | 6/1930 | Ackermann | 249/159 |
| 1,866,790 | 7/1932 | Bateman | 264/225 |
| 1,935,916 | 11/1933 | Ragsdale | 164/46 |
| 4,726,412 | 2/1988 | Magnan et al. | 164/19 |
| 4,740,145 | 4/1988 | Shurman | 425/28.1 |
| 4,777,002 | 10/1988 | Pütz | 264/225 |
| 5,260,014 | 11/1993 | Holton et al. | 264/225 |

FOREIGN PATENT DOCUMENTS 78684 12/1970 Germany ................. 425/175

OTHER PUBLICATIONS

"Sprayed Metal Molds", *Plastic Engineering*, Brenner et al. (Sep. 1952).

*Primary Examiner*—Jay H. Woo
*Assistant Examiner*—Robert B. Davis
*Attorney, Agent, or Firm*—T. P. Lewandowski; Frederich K. Lacher

[57] ABSTRACT

Making a tire mold by spraying molten atomized metal on a model to form a metal shell and then reinforcing the shell with a resin backing to form a mold segment for the tire mold. Modular shoe container assemblies have replaceable backing members for making different size molds and flat plate spacers for providing different thicknesses of the mold segment. In one embodiment a slide block is used for one side of the cavity whereby a sole plate is eliminated.

18 Claims, 13 Drawing Sheets

METHOD AND APPARATUS FOR MAKING A TIRE MOLD

BACKGROUND OF THE INVENTION

This invention relates to making a tire mold by spraying molten atomized metal on a model to form a shell and then reinforcing the shell with a resin backing to form a mold segment for the tire mold. It has been found that this method of making a mold segment is much faster than the conventional methods of casting and machining mold segments. The time saved is particularly important when molds are needed for new tread designs which need to be road tested.

Heretofore a tread segment for a tire mold has been made by spraying low temperature atomized metal over a tread segment pattern to form a shell having the same configuration as the pattern. The shell was then provided with a backing of resin filler or other suitable material to support the shell before the pattern was removed. It has been found that in making of tire molds by this method there are problems which are not encountered in making molds for other purposes. For instance in spraying several layers of metal on the tread pattern to build up a laminated shell, there have been problems with cracking of the shell. Difficulties have also been experienced in fitting the segments together to provide a full circle tread molding surface. Also in order to provide the necessary heat conductivity of the mold segments, it has been desirable to mix metal granules in the heated resin. Air and other gases in the hot resin must be removed during injection of the resin into a shoe containing the shell and pattern. It has also been found that there is an optimum size shoe for each tire mold size. Making special size shoes for each size mold segment is not only expensive but time consuming. Another problem in making mold segments is providing venting so that there will be adequate removal of gases from the finished tire mold during vulcanization of tires.

SUMMARY OF THE INVENTION

The present invention provides for spraying several layers of atomized metal on a pattern in such a way that cracking of the mold shell is avoided. After the shell has been sprayed on the pattern the shell and pattern are mounted in a modular shoe assembly which has a replaceable backing member so that the same shoe may be used for different size tire mold segments. It is understood that the invention may be used for making tire molds of two or more segments. The backing material of hot liquid resin filler is mixed with heated metal granules before injection into the shoe and the mixture pierced during the filling operation to release any trapped air or gases. The shoe design provides for a smooth mating surface closure at a bottom end of the shoe. A dam is provided at the top end of the shoe to contain a pool of hot liquid resin filler without the granules so that after cooling of the material in the dam it can be machined to provide a smooth mating surface closure at the other end of the mold segment. The finished mold segment may then be drilled to provide vents opening on grooves in the outer surface leading to joints between the abutting surfaces of the segments providing the necessary venting.

A modified shoe container assembly for holding the model and shell while the resin backing is being applied to the shell has adjustable arms pivoting around an axis with a base plate, cover plate and end plate providing the chamber for the resin backing. With this apparatus tire mold segments of different chord lengths can be made with the same shoe container assembly.

Another alternative shoe container assembly has a space for holding a flat plate spacer to provide different thicknesses of the mold segment.

In still another modification of the shoe container the slide block provides one side of the cavity to be filled with the fluid backing material so that a sole plate is not required.

In accordance with an aspect of the invention, there is provided an apparatus for making a mold segment for a tire mold comprising:

(a) means for forming a model of the mold segment;

(b) means for spraying a plurality of layers of molten atomized metal over the model while permitting each of the layers to cool to a temperature above room temperature after being sprayed and before a next layer is sprayed to produce a shell member;

(c) a shoe container for mounting the model and shell member providing a chamber between the shoe container and the shell member;

(d) means for filling the chamber with a curable, heated fluid backing material to form the mold segment with the shell member attached;

(e) means for heating and curing the fluid backing material to adhere the fluid backing material to the shell member and form the mold segment;

(f) means for removing the mold segment from the shoe container; and (g) means for removing the mold segment with the shell member from the model.

In accordance with another aspect of the invention, there is provided a method of making a mold segment for a tire mold comprising:

(a) forming a model of a tire tread for the mold segment;

(b) spraying a plurality of layers of molten atomized metal over the model while permitting each of the layers to cool to a temperature above room temperature after being sprayed and before the next layer is sprayed to produce a shell member;

(c) mounting the shell member in a shoe container providing a chamber between the shell member and the shoe container;

(d) filling the chamber with a curable heated fluid backing material to form one end of the mold segment and a backing for the shell member;

(e) heating and curing the fluid backing material to adhere the material to the shell member and form the mold segment;

(f) removing the mold segment from the shoe container; and (g) removing the model from the shell member.

To acquaint persons skilled in the arts most closely related to the present invention certain preferred embodiments thereof illustrating the best modes now contemplated for putting the invention into practice are described herein, by and with reference to the annexed drawings forming a part of the specification. The embodiments shown and described herein are illustrative and as will become apparent to those skilled in these arts can be modified in numerous ways within the spirit and scope of the invention defined in the claims hereof.

BRIEF DESCRIPTION OF THE DRAWINGS

Referring to FIGS. 1, 2 and 3, a model 10 of a tire mold segment is shown having a tread portion 12 over which a metal shell 14 may be sprayed. Preferably the model is made of a material which can be removed from the shell 14 and at the same time can be sprayed with molten metal having a temperature of about 150° F. (66° C.). It has been found that a model 10 of hydropetra molded from a rubber tire tread pattern formed on a plaster model can be sprayed with the molten metal and then later dissolved by water. Other materials for the model 10 may be of resilient rubber like material which can be pulled off the shell 14 or wax with ureal. The metal may be sprayed directly on the wax model.

As shown in FIG. 1, the model 10 is mounted on a suitable support 16 at a first spraying station 18 adjacent to another model 10a mounted on a second spraying station 20. Other models 10 may be mounted on other spraying stations along the support 16. In the preferred embodiment there are three spraying stations along the support 16 for supporting the model 10, the model 10a and a third model 10b (not shown).

Figure 1:
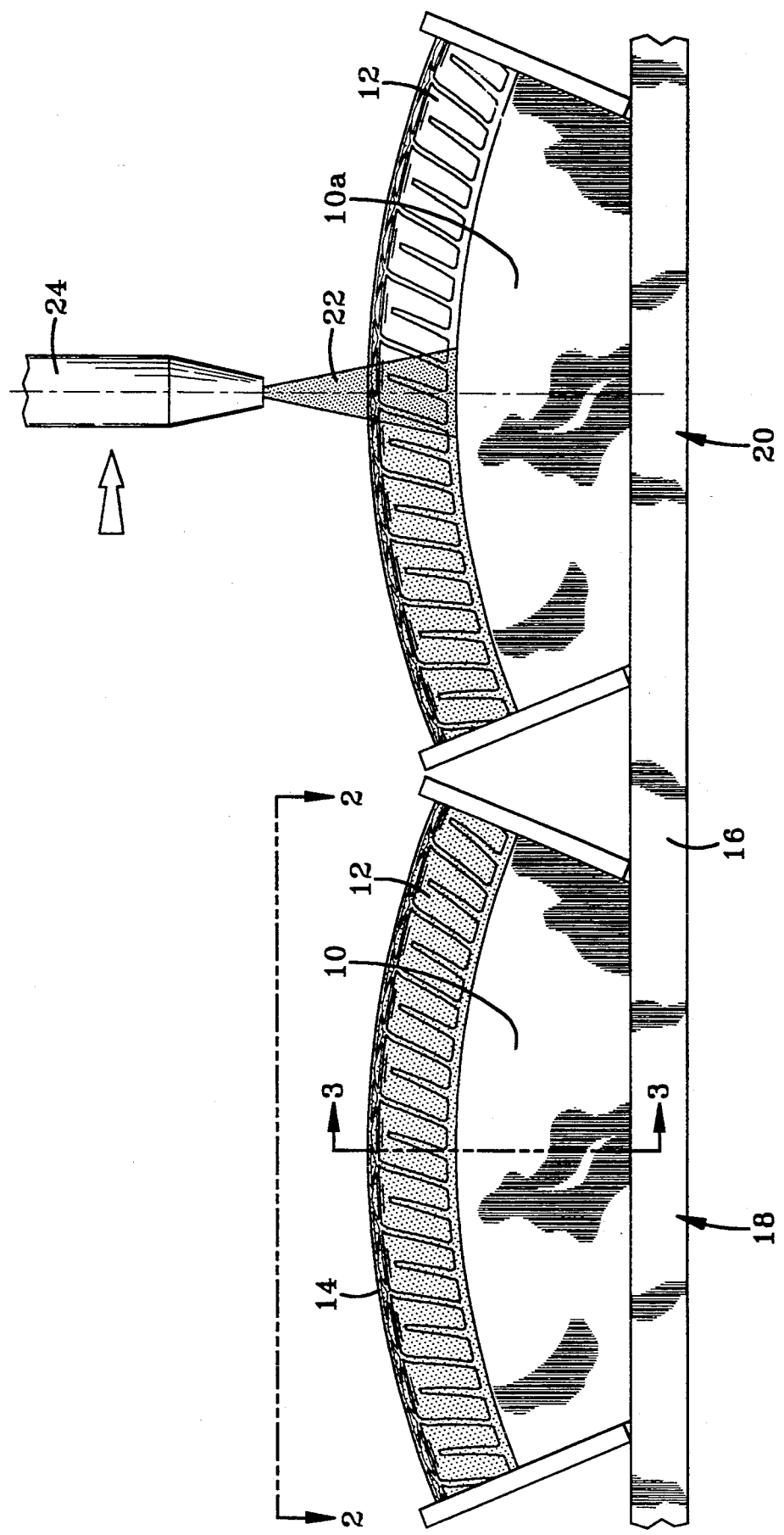
FIG. 1 is a schematic elevation of apparatus for spraying metal on tire mold models to form shell members for tire mold segments in accordance with the invention showing two tire mold models in spraying stations during the process of applying the metal spray.
Figure 2:
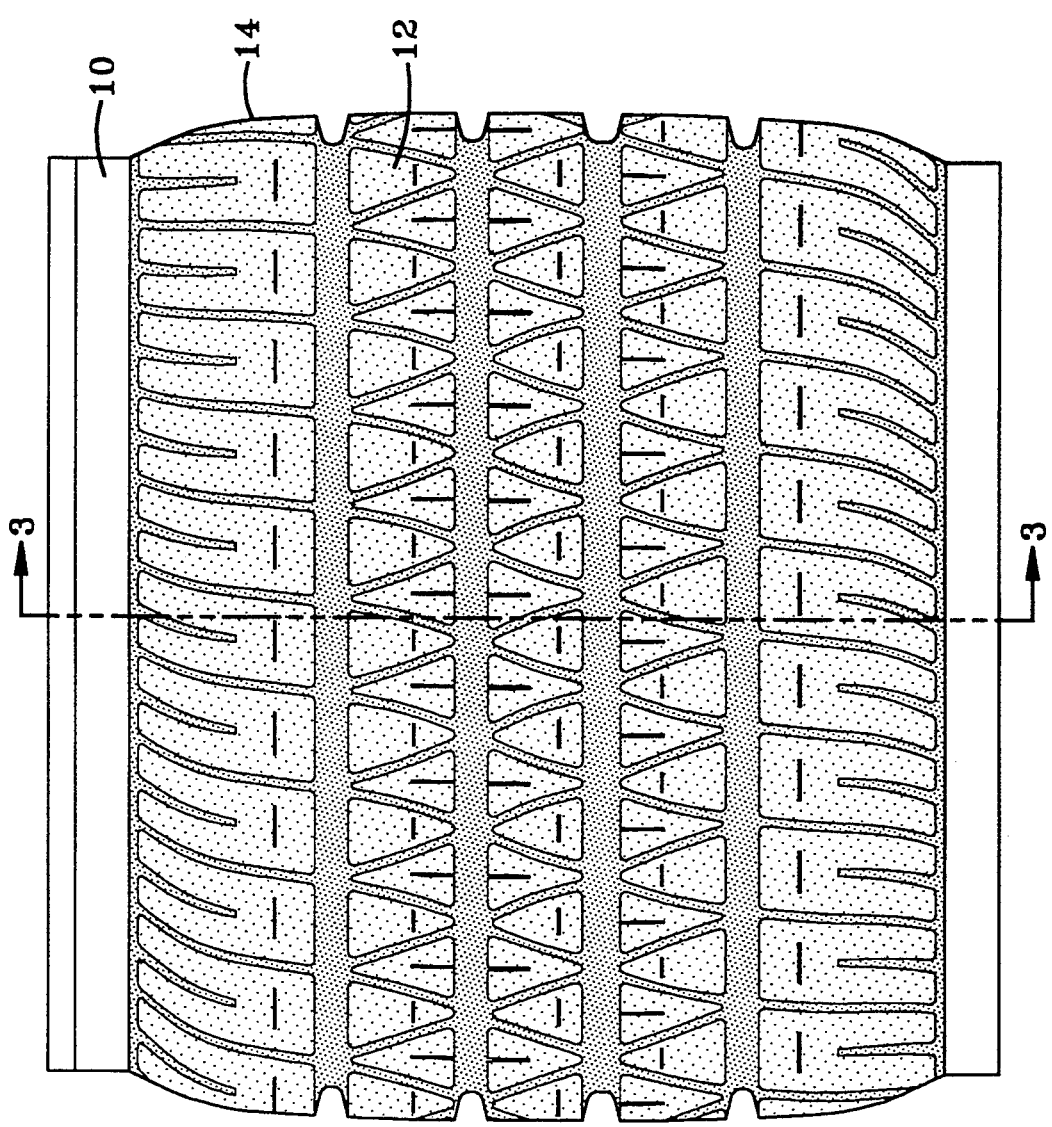
FIG. 2 is a plan view of one of the tire mold models taken along line 2—2 in FIG. 1 after application of the sprayed metal and removal from the spraying station.
Figure 3:
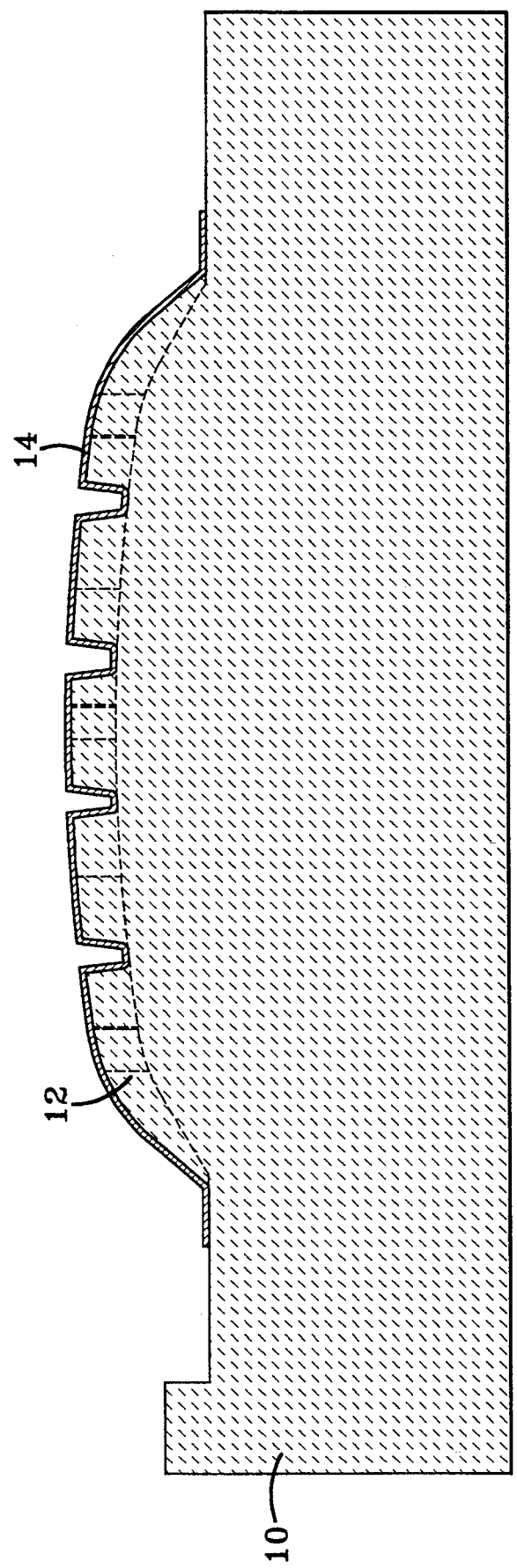
FIG. 3 is a sectional view of the tire mold model and shell taken along the line 3—3 in FIG. 2.

The shell 14 is formed by spraying a plurality of layers of molten atomized metal 22 over the models 10, 10a and 10b at a temperature of around 150° F. (66° C.).

Each layer of metal 22 is cooled to a temperature above room temperature from about 100° F. (33° C.) to 125° F. (52° C.). Before another layer is applied the cooling of the first layer applied to the model 10 at spraying station 18 takes place while the models 10a and 10b are being sprayed. Accordingly, a spray gun 24 may be moved over the models 10, 10a and 10b to apply the first layer of molten metal and then returned for application of the second layer to model 10, at which time the first layer applied to model 10 has cooled sufficiently for application of the second layer. This procedure is followed until the thickness of the shell 14 is from 1/16 to ¼ inch (0.159 to 0.636 centimeters) with the thickness preferably being 1/16 of an inch (0.159 centimeters). Preferably the molten metal is of aluminum or similar metal. The shell 14 may have the desired thickness after spraying around 20 layers of the molten atomized metal 22 on the surface of the model 10.

Figure 4:
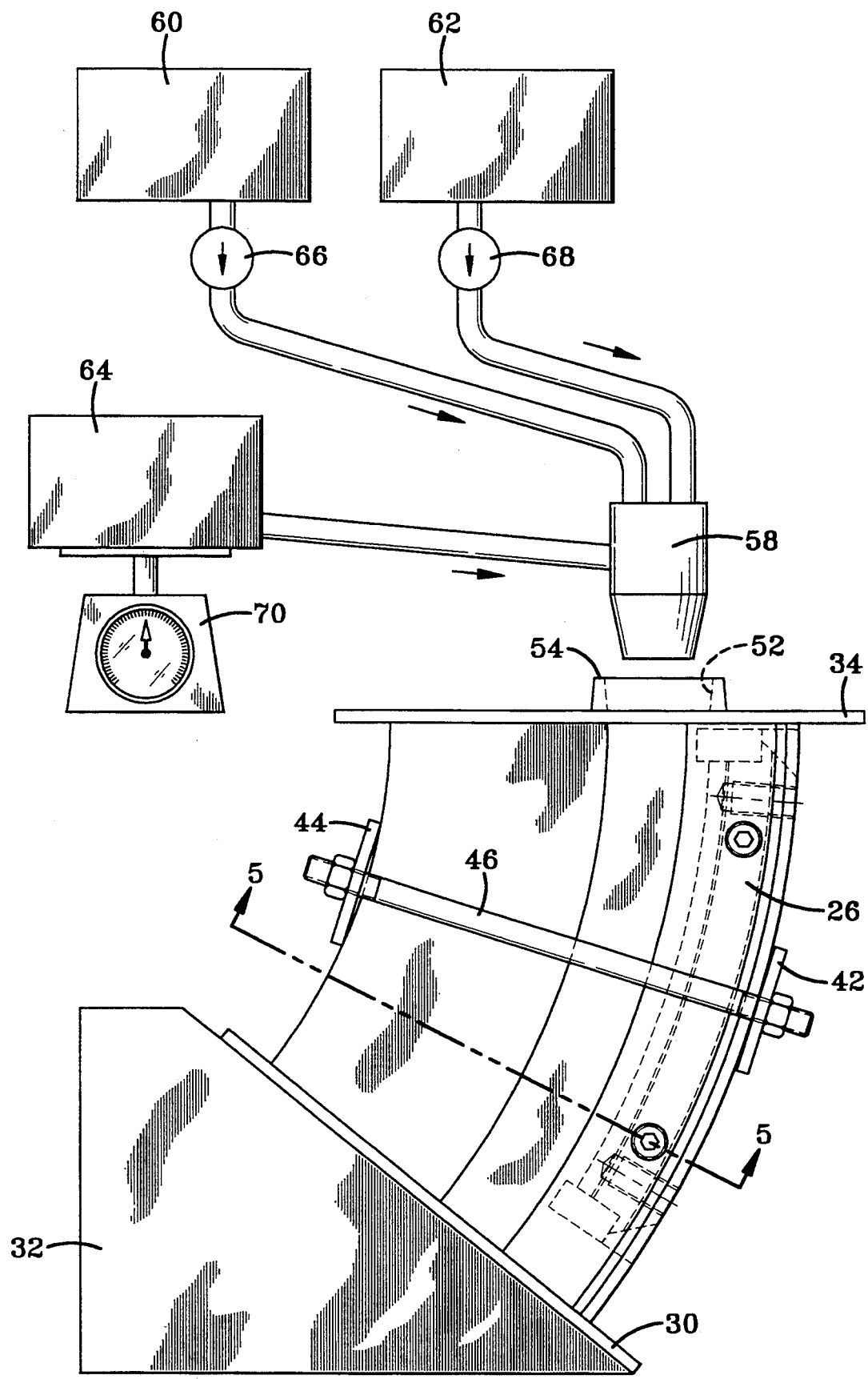
FIG. 4 is an elevation of the shoe container and tire model mounted on one end for injection of the fluid backing material into the other end showing diagrammatically the mixing, weighing and injection of the fluid backing resin, catalyst and metal granules into the chamber of the shoe container.
Figure 5:
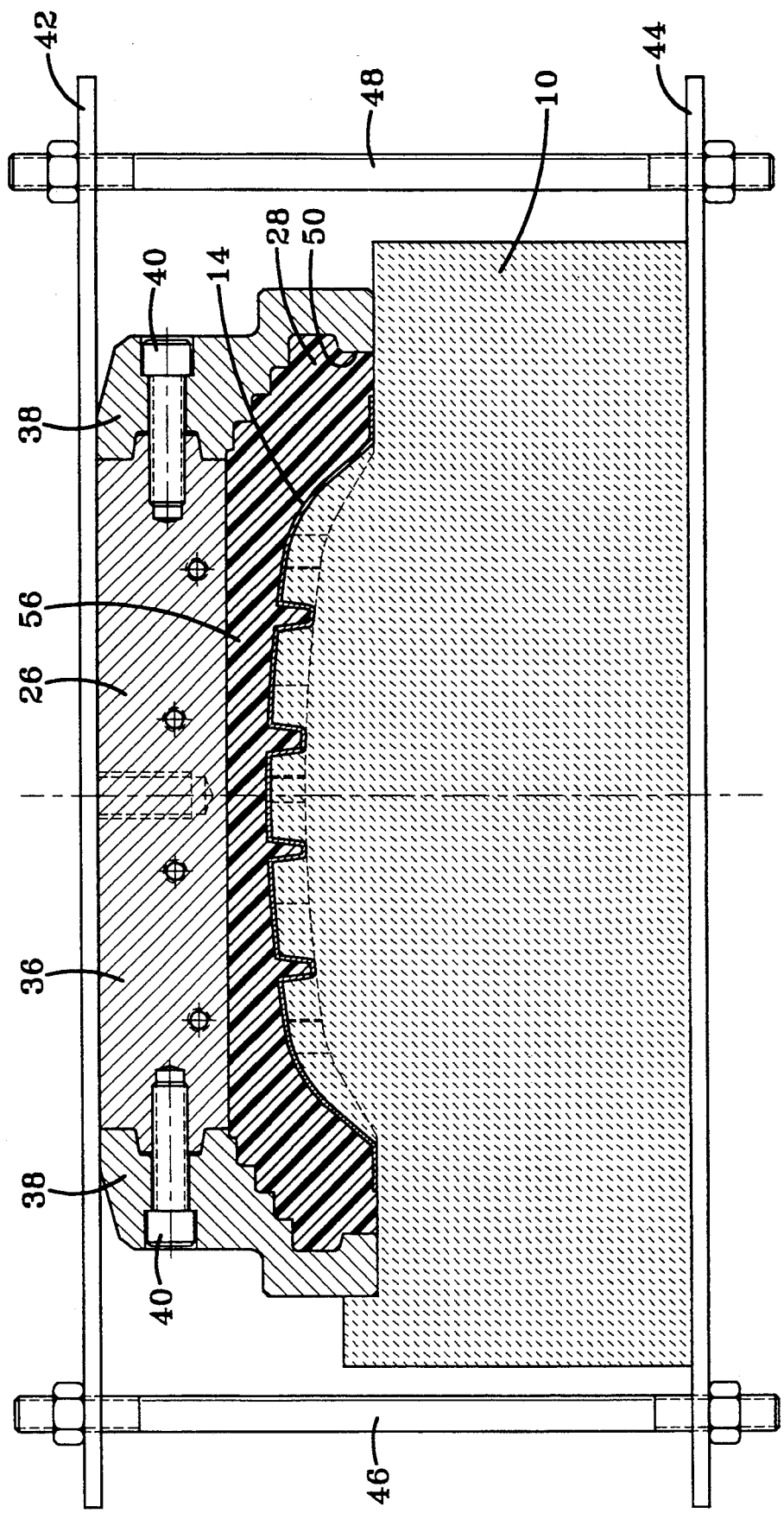
FIG. 5 is a cross section of the shoe container taken along line 5—5 in FIG. 4 showing the modular design and with the chamber filled with fluid backing material and metal granules.

Referring to FIGS. 4 and 5 a shoe container 26 for forming and adhering a fluid backing material 28 to the shell 14 is shown. The shoe container 26 has a shoe base plate 30 at one end for mounting on a sloped container support 32 and an upper end plate 34 covering the upper side of the shoe container. A sole or backing plate member 36 is fastened to ear members or side plates 38 as by screws 40 with the side plates being held in sealing engagement with the model 10 by clamping means such as bars 42 and 44 urged together by bolts 46 and 48. With this construction, a chamber 50 is provided within the shoe container 26 with an opening 52 in the upper end plate 34. A flange 54 extends around the opening 52 providing an upstanding flange dam for a riser.

Figure 6:
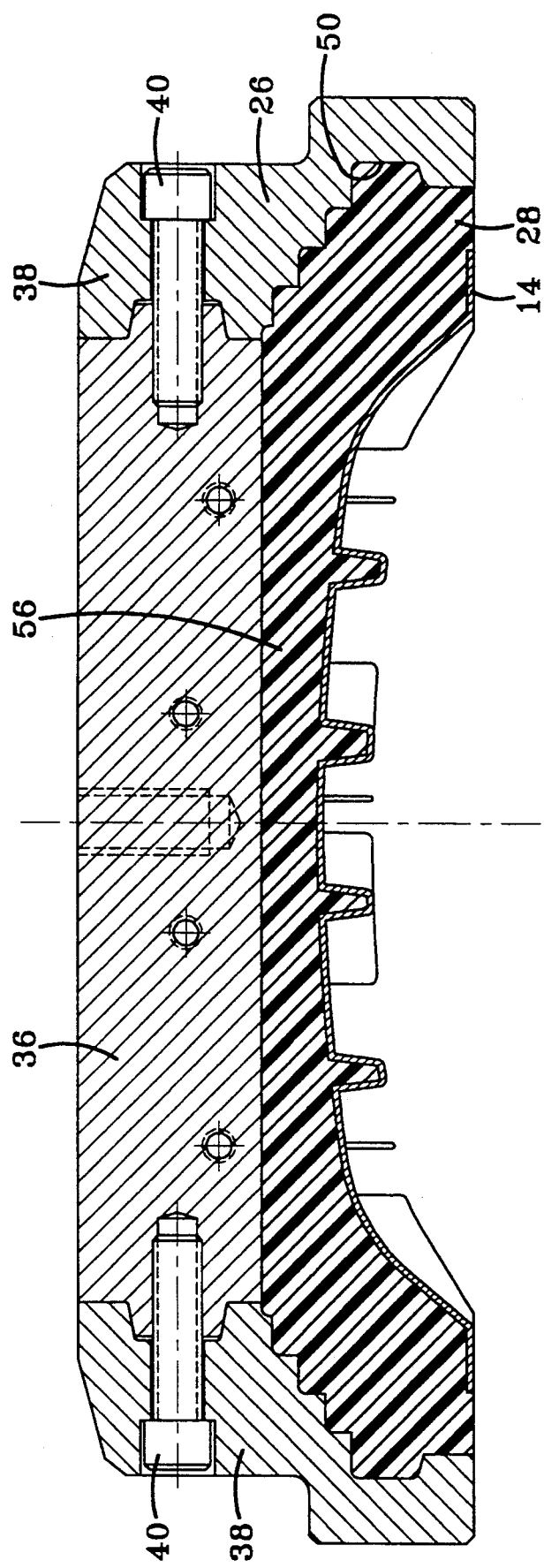
FIG. 6 is a view like FIG. 5 showing the mold segment and shoe container after the fluid backing material mixture has hardened, the tire mold model has been removed and before the mold segment is removed from the shoe container.
Figure 7:
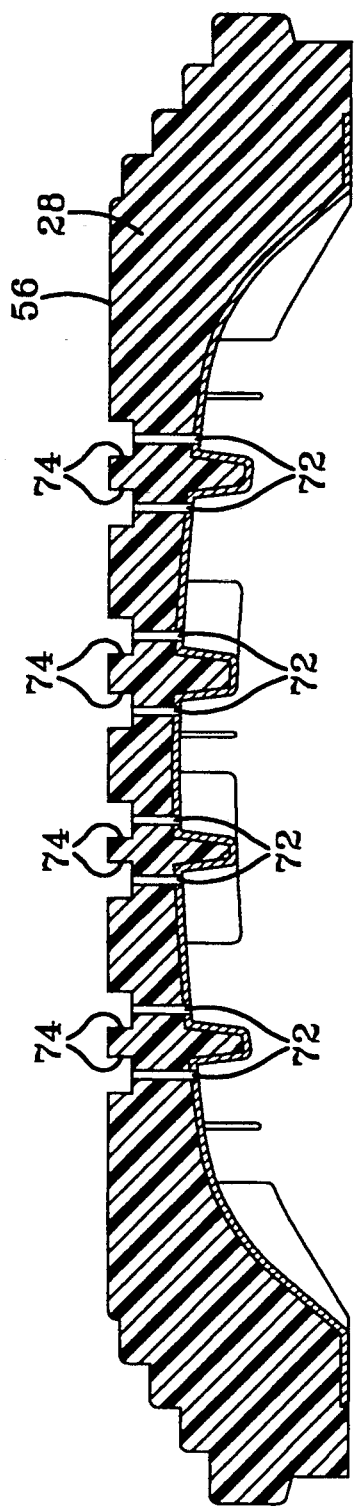
FIG. 7 is a view like FIG. 6 showing the mold segment after removal from the container and after the vents are drilled and the grooves are machined.

The backing plate member 36 is spaced from the shell 14 a predetermined distance depending upon the mold requirements. With a separate backing plate member 36, different size members may be used with the same side plates 38. In FIGS. 5, 6 and 7 a mold segment 56 is shown made from the fluid backing material 28 adhered to the shell 14. The fluid backing material 28 includes metal granules such as aluminum peas which constitute 60 percent of the weight of the mold segment 56. Referring to FIG. 4, the injection of the fluid backing material 28 through a mixing barrel 58 is schematically shown. The fluid backing material 28 is a heated epoxy resin shown contained in tank 60 mixed with a heated epoxy resin catalyst schematically shown in tank 62, both of which are fed into the mixing barrel 58. Another heated tank 64 contains the heated metal granules preheated to 70° C. (120° F.) before adding to the heated resin in barrel 58. The mixture of heated epoxy resin, heated resin catalyst and metal granules is injected into the chamber 50 at a predetermined pressure to fill the chamber. The mixture is provided by metering pumps 66 and 68 and the metal granules are fed by a weight by volume feeding apparatus 70. During the injection of the fluid backing material 28 into the chamber 50, the injection is stopped at intervals so that the material may be pierced and stirred to release any air or gases. Preferably this piercing is done when the chamber 50 is one-half full, three-quarters full and completely full. The chamber 50 may also be in communication with a source of vacuum (not shown) for removing air and gases. When the chamber 50 is completely full the feeding apparatus for the metal granules from the tank 64 is cut off so that the riser in the dam formed by the flange 54 does not contain any of the metal granules. Preferably before injection of the fluid backing material 28 into the chamber 50, the metal granules in tank 64, the epoxy resin in tank 60 and the epoxy resin catalyst in tank 62, as well as the shoe container 26 and the model 10 with the shell 14, are preheated to around 120° F. (70° C.). After injection of the fluid backing material 28 into the chamber 50 the mold segment 56 is placed in an oven at a temperature of about 122° F. (50° C.) for a period of from one to two hours to provide for hardening of the mixture. The mold segment 56 is then removed from the oven and the model 10 removed from the shell 14 by suitable means. For example, where the model 10 is of hydroperm it may be washed out with high pressure water. If the model 10 is of wax and ureal, it can be melted by heating the mold segment 56 to a temperature above the melting temperature of the wax. The mold segment 56 and shoe container 26 after removal of the model 10 is shown in FIG. 6.

Referring to FIG. 7 the mold segment 56 is shown after removal of the segment from the shoe container 26 and separation from the model 10. Vent holes 72 may then be drilled through the mold segment 56 in communication with grooves 74 machined in the radially outer face of the mold segment and extending in a circumferential direction to the end faces of the mold segment which abut the shoe base plate 30 and upper end plate 34. The end face which abuts the upper end plate 34 has a riser of epoxy resin which may be machined to provide a flat, smooth end face for engaging an end face of an adjacent mold segment when the mold is assembled. During operation of the tire mold made of the mold segment 10 and other mold segments, air and gases are vented from the surface of the shell 14 through the vent holes and the groove 74 to the abutting end faces of the mold segments which provide cracks through which the air and gases may escape from the mold.

Figure 8:
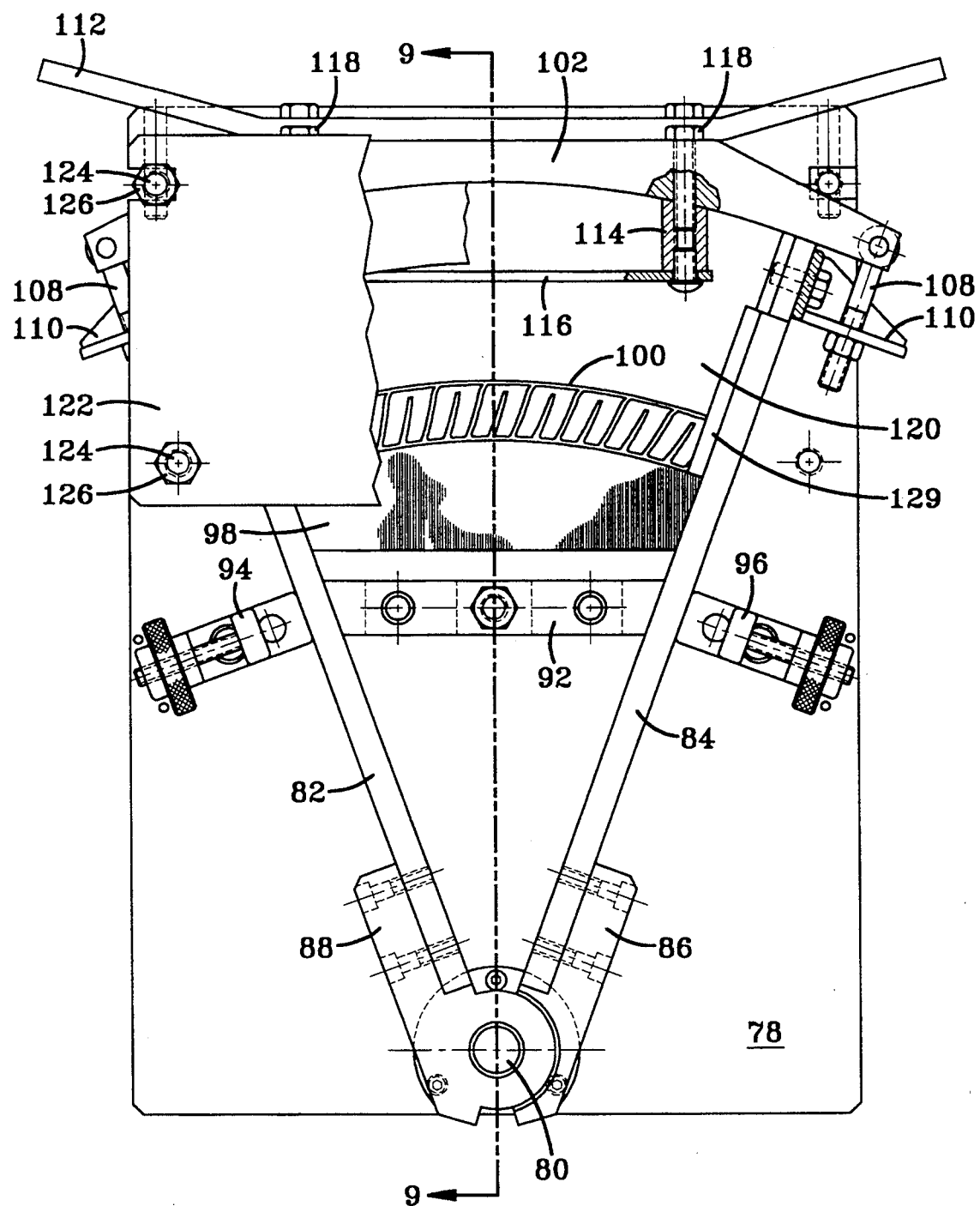
FIG. 8 is a plan view showing a modified shoe container embodying the invention with parts being broken away.
Figure 9:
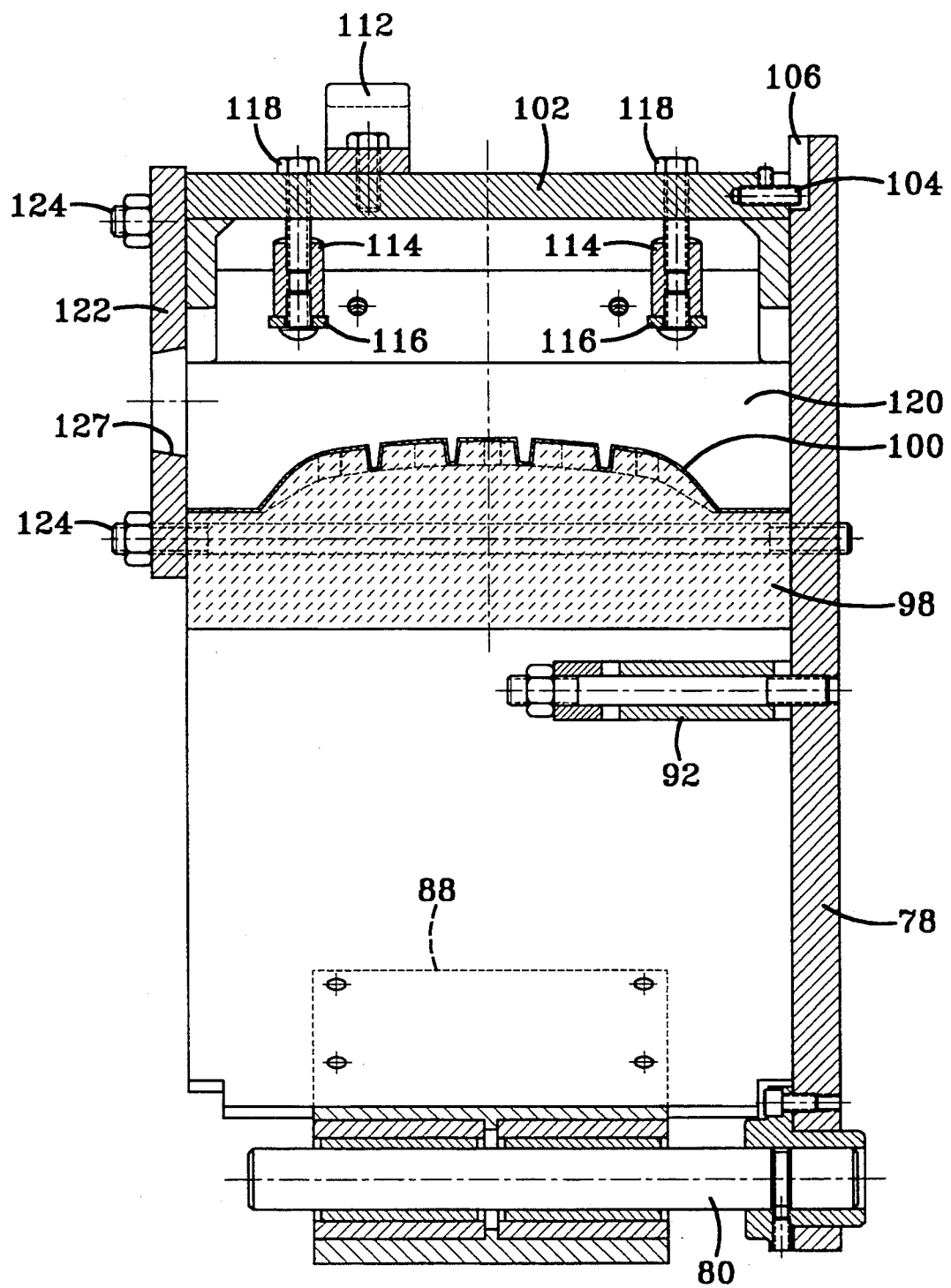
FIG. 9 is a cross section taken along the line 9—9 in FIG. 8.

Referring to FIGS. 8 and 9, a modified shoe container 76 is shown. A flat base plate 78 has a vertical hinge pin 80 mounted at one end. Side arms 82 and 84 have hinge plates 86 and 88 positioned over the hinge pin 80 providing pivotal mounting of the side arms to accommodate different angular size mold segments 90. A setting bar 92 corresponding to the angle of the desired mold segment 90 is mounted on the base plate 78 between the side arms 82 and 84. Adjustable angle clamps 94 and 96 are mounted on the base plate 78 at the opposite side of the side arms 82 and 84 from the setting bar for clamping engagement with the arms. A model 98 having a sprayed shell 100 is mounted between the arms 82 and 84 and end plate 102 is positioned against the ends of the arms 82 and 84 in a central position determined by a pin 104 extending into a central slot 106 in the base plate 78. The end plate 102 may be held in place by swing bolts 108 mounted on the ends of the end plate and engaging flanges 110 extending outwardly from the side arms 82 and 84. A handling bar 112 may be secured to the outer face of the end plate 102.

Internally threaded bushings 114 connected to straps 116 are held in position by bolts 118 extending through the end plate 102 and threaded in the bushings 114. The chamber 120 defined by the end plate 102, base plate 78, side plates 129 and the shell 100 of the model 98 may then be filled with a mixture of heated epoxy resin, epoxy resin catalyst and heated metal granules. The side plates 129 provide a step for locating the model 98 in the shoe container 76. A cover plate 122 may then be lowered onto studs 124 secured to the base plate and secured by nuts 126. Excess material may move out of the chamber 120 through an opening 127 in the cover plate 122 forming a riser in the side surface which can later be removed by machining at the surface.

Figure 10:
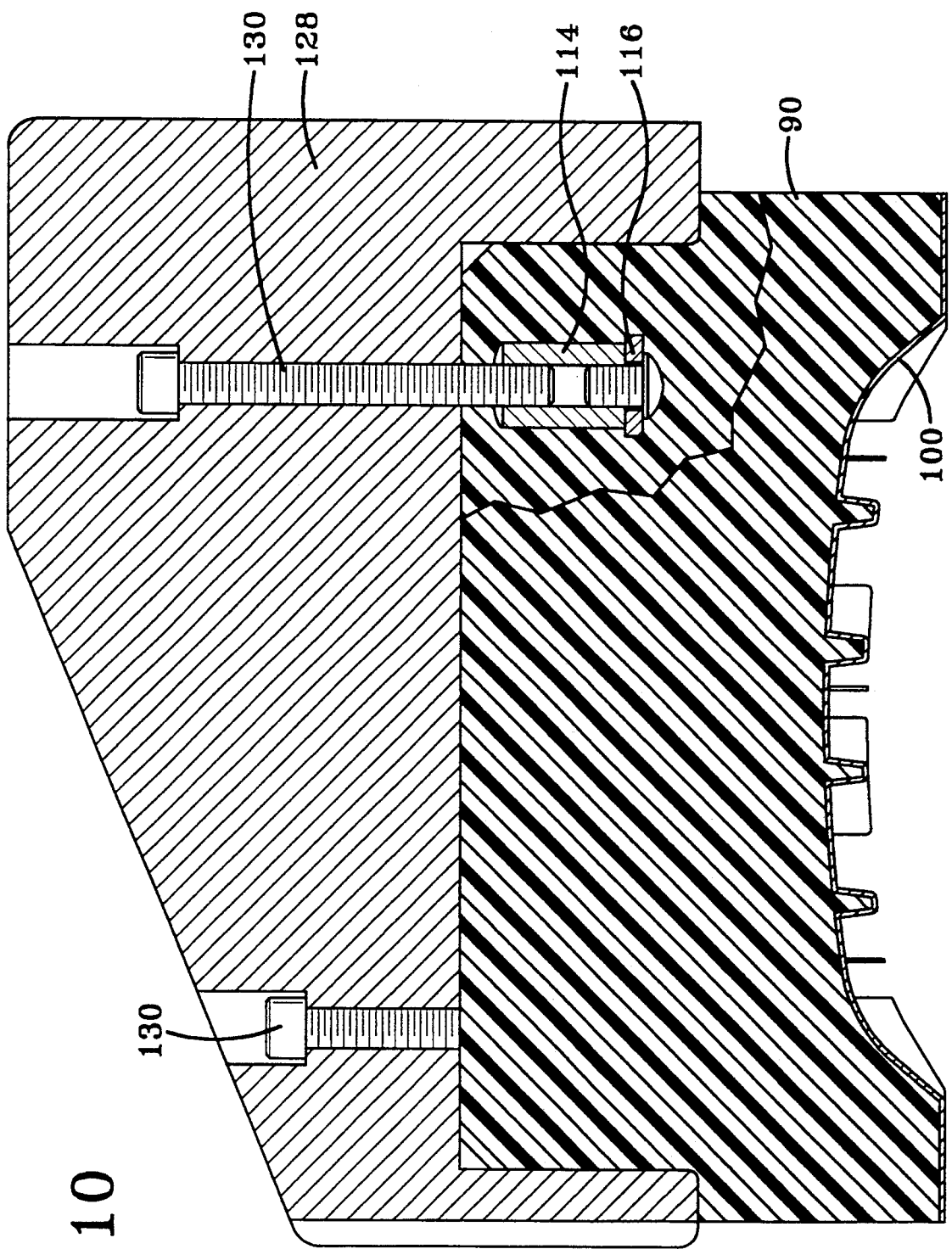
FIG. 10 is a cross section of the mold segment made in the shoe container of FIGS. 8 and 9 with the model removed and mounted in a mold slide block.

After the epoxy resin mixture has been injected into the chamber 120, in a manner similar to that described for the modification described and shown for FIGS. 1 through 7, the nuts 126 are removed so that the cover plate 122 can be removed. The bolts 118 are removed leaving the bushings 114 and straps 116 in the mold segment 90. The clamps 94 and 96 are retracted and the mold segment 90 and the shell 100 and model 98 are then pulled out of the chamber 120 and heated in an oven. The model 98 is then removed leaving the mold segment 90 as shown in FIG. 10. The bushings 114 can be used to attach the mold segment to a slide block 128 of a tire press by bolts 130 threaded in the bushings 114.

The shoe container 76 may be modified to produce more than one mold segment 90 by adding additional side arms 82 and 84 with additional hinge plates 86 and 88 positioned over the hinge pin 80.

Figure 11:
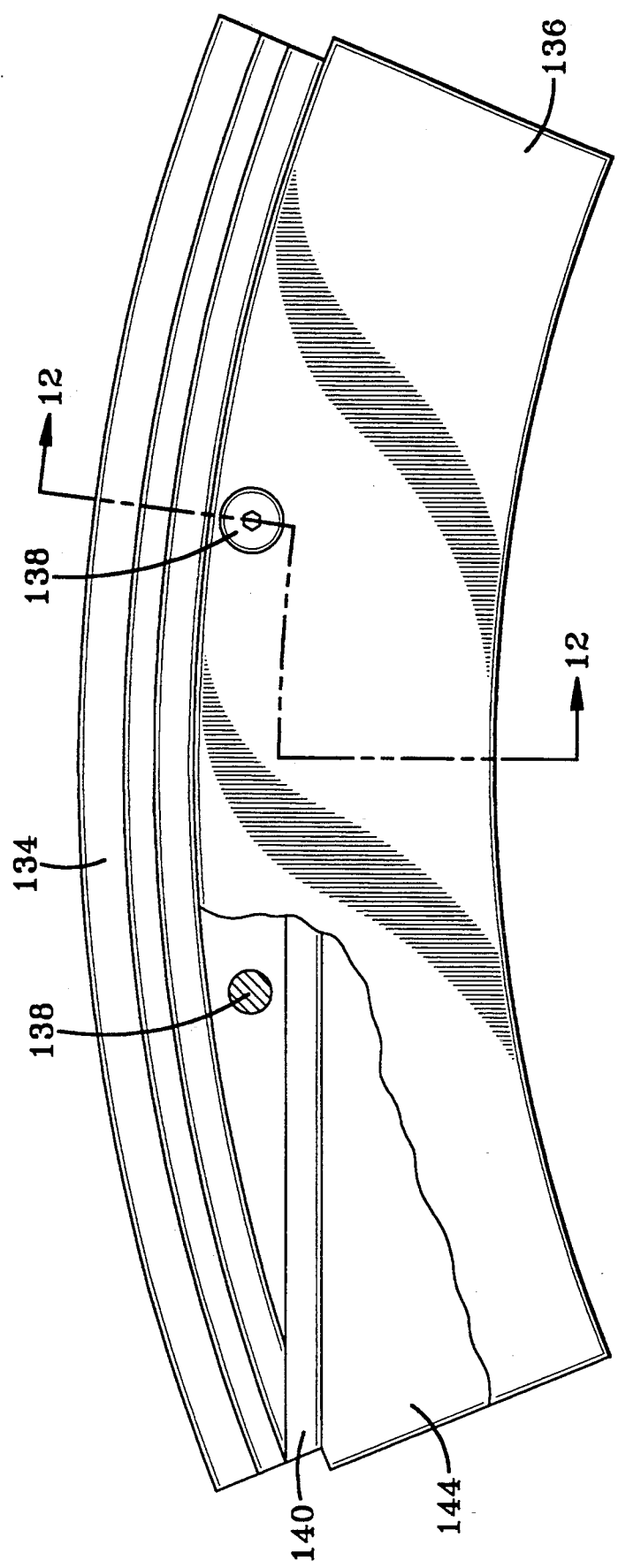
FIG. 11 is a view like FIG. 4 of a modified shoe container with parts being broken away.
Figure 12:
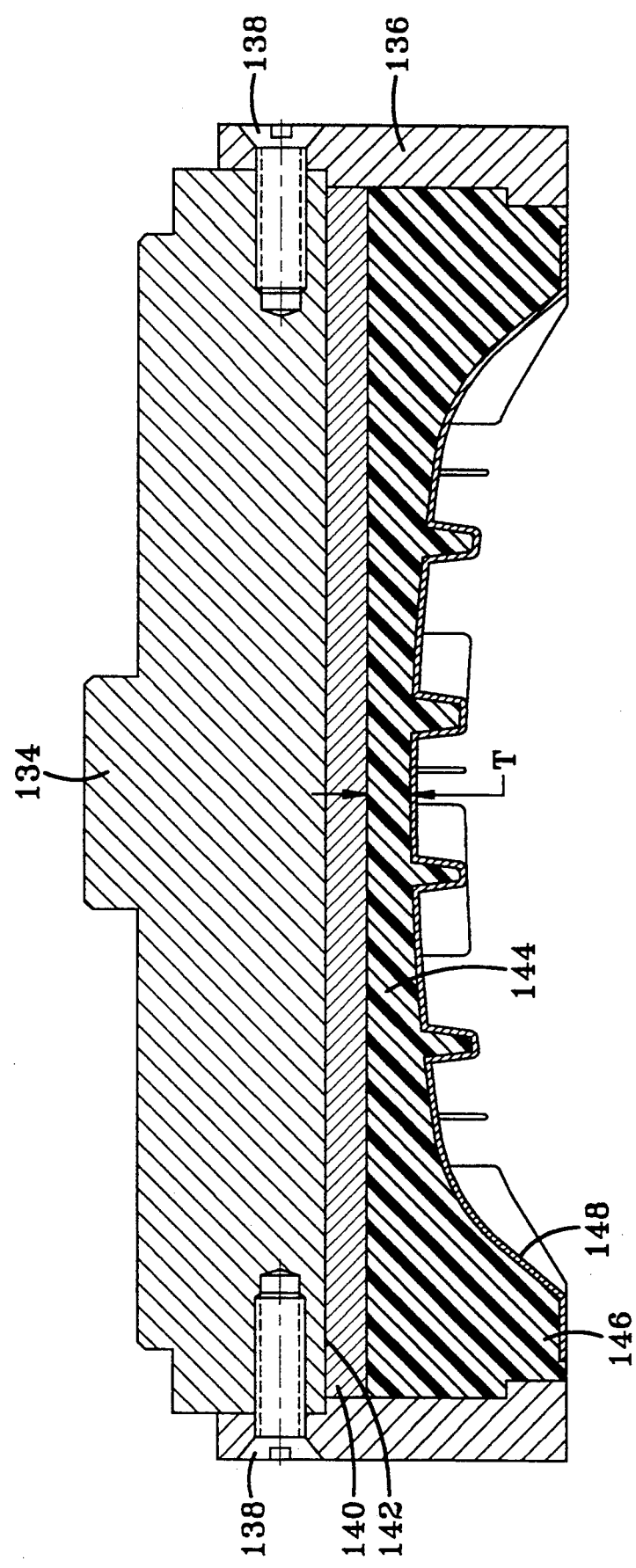
FIG. 12 is a cross section of the shoe container taken along line 12—12 in FIG. 11.

Referring to FIGS. 11 and 12 another modified shoe container 132 similar to the shoe container of FIGS. 4 and 5 is shown having a sole or backing plate member 134 fastened to ear members or side plates 136 as by screws 138. In this shoe container a flat spacer plate 140 is positioned against a flat surface 142 of the backing plate member 134 to determine the thickness "T" of fluid backing material 144 at the center line of a mold segment 146 having a shell 148.

Where it is desirable to have a decreased thickness "T" of fluid backing material 144 a spacer plate 140 of increased thickness is used and where an increased thickness "T" is desired a spacer plate of decreased thickness is used. Then when the fluid backing material 144 is injected it will fill the space between the spacer plate 140 and the shell 148. The desired gap or thickness "T" between the spacer plate 142 and shell may be from 0.0325 inch (1.952 cm) to 2 inches (5.18 cm). It can be seen that with this construction different size gaps or thickness "T" may be obtained by simply substituting spacer plates 140 of different thicknesses.

Figure 13:
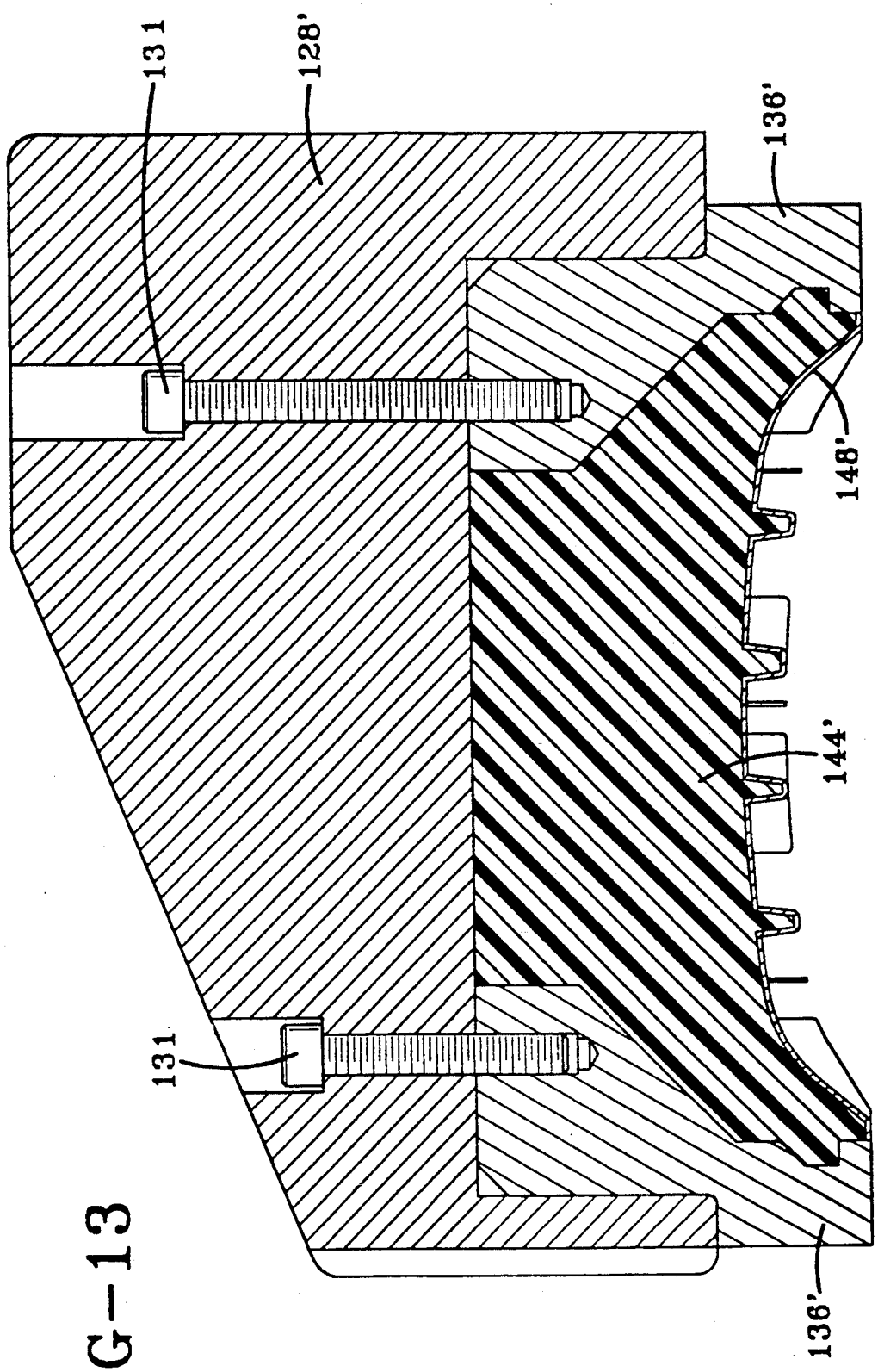
FIG. 13 is a cross section like FIGS. 10 and 12 showing a still further modified shoe container.

Referring to FIG. 13 a further modification is shown in which the fluid backing material 144' is injected into a cavity between the shell 148', slide block 128', side plates 136' and end plates such as the shoe base plate 30 and end plate 34 shown in FIG. 4.

By injecting the fluid backing material 144' directly into contact with the slide block 128' it is not necessary to have a special backing plate such as the sole plate 134 shown in FIG. 12. Bolts 131 may be provided to hold the slide block 128' against the side plates 136'.

While representative embodiments and details have been shown for the purpose of illustrating the invention, it will be apparent to those skilled in the art that various changes and modifications may be made therein without departing from the spirit or scope of the invention.

What is claimed is:

1. Apparatus for making a mold segment for a tire mold having a mold segment comprising:
   (a) means for forming a model of said mold segment;
   (b) means for spraying a plurality of layers of molten atomized metal over said model while permitting each of said layers to cool to a temperature above room temperature after being sprayed and before a next layer is sprayed to produce a shell member;
   (c) a shoe container for mounting said model and shell member providing a chamber between said shoe container and said shell member including a backing member spaced from said shell member and having side plates for engaging said model at the edges of said shell member, clamping means for holding said side plates in sealing engagement with said model;
(d) means for filling said chamber with a curable, heated fluid backing material to form said mold segment with said shell member attached including an opening in one of said side plates positioned at an upper side of said shoe container and the other one of said side plates being positioned at a lower side of said shoe container;
(e) means for heating and curing said fluid backing material to adhere said fluid backing material to said shell member and form said mold segment;
(f) means for removing said mold segment and model from said shoe container; and
(g) means for removing said mold segment with said shell member from said model.

2. Apparatus for making a mold segment for a tire mold having a mold segment comprising:
(a) means for forming a model of said mold segment;
(b) means for spraying a plurality of layers of molten atomized metal over said model while permitting each of said layers to cool to a temperature above room temperature after being sprayed and before a next layer is sprayed to produce a shell member;
(c) a shoe container for mounting said model and shell member providing a chamber between said shoe container and said shell member;
(d) means for filling said chamber with a curable, heated fluid backing material to form said mold segment with said shell member attached;
(e) means for heating and curing said fluid backing material to adhere said fluid backing material to said shell member and form said mold segment;
(f) means for removing said mold segment and model from said shoe container; and
(g) means for removing said mold segment with said shell member from said model and wherein said shoe container includes a base plate, a cover plate, an end plate and a pair of side arms pivotally mounted for adjustment to a desired angle between said arms to engage end portions of said model and define said chamber with said shell member, said cover plate, said end plate, said base plate and said side arms.

3. Apparatus for making a mold segment for a tire mold having a mold segment comprising:
(a) means for forming a model of said mold segment;
(b) means for spraying a plurality of layers of molten atomized metal over said model while permitting each of said layers to cool to a temperature above room temperature after being sprayed and before a next layer is sprayed to produce a shell member;
(c) a shoe container for mounting said model and shell member providing a chamber between said shoe container and said shell member;
(d) means for filling said chamber with a curable, heated fluid backing material to form said mold segment with said shell member attached;
(e) means for heating and curing said fluid backing material to adhere said fluid backing material to said shell member and form said mold segment;
(f) means for removing said mold segment and model from said shoe container; and
(g) means for removing said mold segment with said shell member from said model; and wherein said shoe container comprises a backing plate member spaced from said shell member and having side plates for fastening to said backing plate member, a spacer plate positioned at an inner surface of said backing plate member to adjust the gap between said shell member and said spacer plate for providing a desired thickness of said mold segment.

4. Apparatus for making a mold segment for a tire mold having a mold segment comprising:
(a) means for forming a model of said mold segment;
(b) means for spraying a plurality of layers of molten atomized metal over said model while permitting each of said layers to cool to a temperature above room temperature after being sprayed and before a next layer is sprayed to produce a shell member;
(c) a shoe container for mounting said model and shell member including a slide block, side plates and end plates providing a chamber between said shoe container and said shell member;
(d) means for filling said chamber with a curable, heated fluid backing material to form said mold segment with said shell member attached;
(e) means for heating and curing said fluid backing material to adhere said fluid backing material to said shell member and form said mold segment;
(f) means for removing said mold segment and model from said shoe container; and
(g) means for removing said mold segment with said shell member from said model.

5. A method of making a mold segment for a tire mold comprising:
(a) forming a model of a tire tread for said mold segment;
(b) spraying a plurality of layers of molten atomized metal over said model while permitting each of said layers to cool to a temperature above room temperature after being sprayed and before the next layer is sprayed to produce a shell member;
(c) mounting said model and shell member to a shoe container providing a chamber between said shell member and said shoe container;
(d) filling said chamber with a curable, heated fluid backing material to form one end of said mold segment and a backing for said shell member;
(e) heating and curing said fluid backing material to adhere said material to said shell member and form said mold segment;
(f) removing said mold segment from said shoe container;
(g) removing said model from said shell member and wherein said shoe container is positioned to form said mold segment with said one end below an upper end and an opening in said shoe container adjacent said upper end has a flanged dam around said opening comprising filling said container with a mixture of epoxy, epoxy catalyst and metal granules, then filling said flanged dam with said mixture, excluding said metal granules to form a riser in an upper face of said segment and then machining said upper face to remove said riser from said segment.

6. A method of making a mold segment for a tire mold comprising:
(a) forming a model of a tire tread for said mold segment;
(b) spraying a plurality of layers of molten atomized metal over said model while permitting each of said layers to cool to a temperature above room temperature after being sprayed and before the next layer is sprayed to produce a shell member;

(c) mounting said model and shell member in a shoe container providing a chamber between said shell member and said shoe container;

(d) filling said chamber with a curable, heated fluid backing material to form one end of said mold segment and a backing for said shell member while stirring said mixture by piercing with a wire during injection of said mixture;

(e) heating and curing said fluid backing material to adhere said material to said shell member and form said mold segment;

(f) removing said mold segment from said shoe container; and (g) removing said model from said shell member.

7. A method of making a mold segment for a tire mold comprising:

(a) forming a model of a tire tread for said mold segment;

(b) spraying a plurality of layers of molten atomized metal over said model while permitting each of said layers to cool to a temperature above room temperature after being sprayed and before the next layer is sprayed to produce a shell member;

(c) mounting said model and shell member in a shoe container providing a chamber between said shell member and said shoe container;

(d) filling said chamber with a curable, heated fluid backing material to form one end of said mold segment and a backing for said shell member;

(e) heating and curing said fluid backing material to adhere said material to said shell member and form said mold segment;

(f) removing said mold segment from said shoe container;

(g) removing said model from said shell member; and (h) including machining circumferentially extending grooves in the back of said mold segment and drilling vents through said mold segment in communication with said grooves whereby gases formed during vulcanization may be vented through said vents to said grooves and then through said grooves to the interstices between adjacent tread segments.

8. A method of making a mold segment for a tire mold comprising:

(a) forming a model of a tire tread for said mold segment;

(b) spraying a plurality of layers of molten atomized metal over said model while permitting each of said layers to cool to a temperature above room temperature after being sprayed and before the next layer is sprayed to produce a shell member;

(c) mounting said model and shell member on a base plate between a pair of side arms engagable with end portions of said model;

(d) mounting an end plate on said base plate in clamping engagement with said side arms;

(e) fastening a cover plate over said side arms and end plate providing a chamber between said shell member and said shoe container;

(f) filling said chamber with a curable, heated fluid backing material to form one end of said mold segment and a backing for said shell member;

(g) heating and curing said fluid backing material to adhere said material to said shell member and form said mold segment;

(h) removing said mold segment from said shoe container; and (i) removing said model from said shell member.

9. The apparatus of claim 1, including an upstanding flanged dam extending around said opening for containing a riser of said fluid backing material upon filling of said chamber.

10. The apparatus of claim 1, wherein said backing plate member comprises a separate backing plate and side plates with fastening means for mounting said side plates on said backing plate so that different backing plates may be used with one set of side plates.

11. The apparatus of claim 2 wherein said means for filling said chamber includes an opening in said cover plate.

12. The apparatus of claim 2 wherein said end-plate has bolts for engaging internally threaded bushings supported in said chamber for embedding in said mold segment to provide threaded connections for fastening said mold segment to a mold side block.

13. The apparatus of claim 2 including adjustable clamp members removably fastening said end plate to said side arms.

14. The apparatus of claim 2 including a side arm angle setting means positioned between said side arms and fastened to said base plate.

15. The apparatus of claim 2 including centering means for positioning said end plate on said base plate.

16. The apparatus in accordance with claim 15 wherein said centering means comprises a pin mounted on said end plate and a slot in said base plate for engagement with said pin.

17. The apparatus of claim 3 wherein said spacer plate and said inner surface of said backing plate member are flat.

18. The method of claim 6, wherein said intervals are when said chamber is one-half, three-quarters and completely full.

* * * * *

UNITED STATES PATENT AND TRADEMARK OFFICE
CERTIFICATE OF CORRECTION

PATENT NO. : 5,449,483
DATED : September 12, 1995
INVENTOR(S) : Greenwood et al.

It is certified that error appears in the above-indentified patent and that said Letters Patent is hereby corrected as shown below:

In Claim 6, Column 9, line 9 of the Patent, after "wire", insert --at intervals--.

Signed and Sealed this

Eighteenth Day of June, 1996

Attest:

BRUCE LEHMAN

Attesting Officer

Commissioner of Patents and Trademarks